United States Patent
Kou

(10) Patent No.: US 6,363,365 B1
(45) Date of Patent: Mar. 26, 2002

(54) MECHANISM FOR SECURE TENDERING IN AN OPEN ELECTRONIC NETWORK

(75) Inventor: Weidong Kou, Scarborough (CA)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/207,094

(22) Filed: Dec. 7, 1998

(51) Int. Cl.[7] ............................................. G06F 17/60
(52) U.S. Cl. .......................... 705/64; 705/78; 705/37; 705/26
(58) Field of Search ................ 705/1, 50–77, 705/26, 64, 74, 75, 78, 37

(56) References Cited

U.S. PATENT DOCUMENTS

| | | | | |
|---|---|---|---|---|
| 4,458,109 A | * | 7/1984 | Mueller-Schloer | 178/22.11 |
| 5,491,750 A | | 2/1996 | Bellare et al. | 380/21 |
| 5,638,446 A | | 6/1997 | Rubin | 380/25 |
| 5,850,442 A | * | 12/1998 | Muftic | 380/21 |
| 6,014,644 A | * | 1/2000 | Erickson | 705/37 |
| 6,055,518 A | * | 4/2000 | Franklin et al. | 705/37 |
| 6,161,099 A | * | 12/2000 | Harrington et al. | 705/37 |

FOREIGN PATENT DOCUMENTS

| | | | | |
|---|---|---|---|---|
| GB | 2332833 | 6/1999 | ............. | G07F/7/10 |

OTHER PUBLICATIONS

Michiharu Kudo, Secure Electronic Sealed–Bid Auction Protocal with Public Key Cryptography,IEICE Trans. Fundamentals. vol. E81–A,No. 1 Jan. 1198.*

Bruce Schneier, Applied Cryptography, Second Edition, 1996, John Wiley & Sons,Inc,Chapter 24.5,Kerberos, pp. 566–571.*

"Secure Electronic Sealed–Bid Auction Protocol with Public Key Cryptography", By, Michiharu Kudo, Tokyo Research Laboratory, IBM Japan.

* cited by examiner

Primary Examiner—James P. Trammell
Assistant Examiner—Daniel Greene
(74) Attorney, Agent, or Firm—A. Bruce Clay; Carstens, Yee & Cahoon

(57) ABSTRACT

A mechanism for securing bid proposals until close of tendering is provided for an electronic tendering system over an open network. In order to be permitted to file a bid electronically in response to an invitation to tender, prospective vendors encrypt their bid proposals using session keys obtained from a third party source. The encrypted proposals are filed with the bid requester who does not have access to the session keys while the tendering period remains open. The encrypted bid proposals are cached in a safe repository until close of tendering. In one embodiment, the bid requester itself holds onto the encrypted proposals, and obtain the session keys for accessing their contents from the third party on expiry of the bid submission period. In another embodiment, the bid requester double-encrypts each encrypted bid proposal as it is received using its own privately-held key, and forwards the double-encrypted proposals to the third party to hold in a safe repository until the close of tendering. The third party then returns the double-encrypted proposals to the bid requester along with the session keys to permit the bid requester to access their contents. In either case, the party that caches the bid proposals until the close of tendering does not have access to the key required to decrypt the proposals.

15 Claims, 4 Drawing Sheets

MECHANISM FOR SECURE TENDERING IN AN OPEN ELECTRONIC NETWORK

FIELD OF THE INVENTION

The present invention is directed, in general, to the field of computer networking, and, specifically, to a mechanism that provides secure open tendering in an electronic business environment.

BACKGROUND OF THE INVENTION

Broadly speaking, electronic business can be thought of as any type of commercial transaction, or part of a transaction, carried on through a computer network, a configuration of data processing Computer networks can be classified according to the extent of their security, Open networks, such as the Internet, do not have in place any intentional impediments to the free flow of information. (Network traffic and the limitations of hardware may slow or even stop a transmission, but this is random and unintentional.)

On the other extreme, completely closed networks provide communication for a defined group of users over dedicated hardware with no external linkage. Most networks used today by commercial enterprises such as businesses and governments have external communication links to the Internet, but protect internal files and databases from external users with special filtering software usually referred to as a "firewall". Provided the firewall software is robust enough to withstand "hacking" from external users, users on the internal network can safely access the Internet.

Businesses or governments may extend their closed network connections to their trading partners (e.g., suppliers) to allow the partners to gain limited access to their internal network resources such as inventory database so that adequate inventory level can be maintained.

Improvements in computer hardware and software have made the Internet and other "open" networks an increasingly attractive arena for conducting electronic commercial transactions. Unlike closed systems, dedicated communication links are not required, and a potentially greater "audience" (customers, suppliers, etc.) can be reached.

One area of significant development over the past few years has been in the area of securing transmissions against interception or corruption (tampering) by so-called "hackers" or other third parties not intended as recipient. This is an absolute pre-requisite to any communication of a commercial nature, since these can involve the transmission of sensitive financial information, from consumer credit card numbers to preferential customer pricing, or of information that requires accuracy, such as product orders and bid tenders.

To conduct secure communications, authentication and encryption technologies are required. Authentication is to provide a proof to a network that a network entity (e.g., a network user or a network client) is indeed the one whom it claimed to be. Encryption is to prevent a network entity from assessing the confidential information for which it is not authorized to access.

Third party authentication is one way to secure communications between a client and server over an open network. One well known trusted third party authentication protocol is the "Kerberos" model developed by MIT. (See for example J. G. Steiner, B. C. Neuman, and J. I. Schiller, "Kerberos: Authentication service for open network systems," USENIX Conference Proceedings, February 1988, pp. 191–202; and J. T. Kohl, "The evolution of the Kerberos authentication service," EurOpen Conference Proceedings, May 1991, pp. 295–313.) In the Verberos model, in order to secure communications to a server, the client first contacts a Key Distribution Centre KDC), by identifying itself and presenting a nonce (a non-repeating identifier), in requesting credentials for use with the particular server. The KDC assembles a response that includes a session key, the nonce and a ticket. The ticket identifies the client, specifies the session key and lists start and expiration times for use of the ticket, and is encrypted by the KDC using a key shared with the server. The KDC returns the response to the requesting client which decrypts it, checks the nonce and caches the ticket for future use. When the client want to communicate with the server, it presents the ticket and a freshly-generated authenticator to the server. On receipt, the server decrypts the ticket using the key it shares with the KDC, and uses the session key from the ticket to verify the client's identity and that the time stamp is current.

Kerberos is based on Needham-Schroeder's much earlier work on trusted third party protocol: R. M. Needham and M. D. Schroeder, "Using encryption for authentication in large networks of computers," Communication of the ACM, Vol. 21, No. 21, December 1978, pp. 993–999; and R. M. Needham and M. D. Schroeder, "Authentication Revised," Operating Systems Review, Vol. 21, No. 1, January 1987, pp. 7.

Communications can be encrypted, using any of standard or non standard encryption algorithms, such as the algorithms defined in Data Encryption Standard (DES), triple DES, International Data Encryption Algorithm (IDEA), and RC2 and RC4 developed by RSA Data Security Inc. These encryption algorithms are known as symmetric key encryption algorithms since both sending and receiving parties share the same encryption key. The encryption key must be communicated secretly between sending and receiving parties and the key must be kept secretly. Associated with symmetric key encryption, there is key management which handles issues such as how keys are created, distributed, stored, and destructed. The key management can be a problem, particularly when one client or server has millions of correspondents. The distribution and management of the symmetric encryption keys can be a nightmare. The invention of public key crypto-systems has resolved this problem. The public key crypto-systems are also known as asymmetric key systems since encryption keys are different from decryption keys. In a public key crypto-system, there are a key pair, one is known as the public key, and the other is the private key. The public key as by its name is made public so that everyone who wishes to access it can access it. The private key is kept secretly. If A wants to encrypt data and sends to B, A first find B's public key and encrypt the data using the public key, then sends the encrypted data to B. B can decrypt the encrypted data using its private key. Since only B knows its private key, there is no others who can decrypt the encrypted data. Therefore, the confidentiality of data is well kept. Since the current public key encryption and decryption is not efficient comparing to the symmetric key encryption, a common approach is to create a symmetric key known as a session key to encrypt data, and to use the public key of the receiving party to encrypt the session key. After receiving the encrypted session key and the encrypted data, the receiving party first decrypts the encrypted session key using its private key. Then, it decrypts the encrypted data using the session key. To be able to deploy the public key systems, the public key infrastructure (PKI) is required, which enables communications parties to register themselves, and obtain their and others certificates which contains public keys and which are verified by the public key issuer known as the certificate authority (CA).

To conduct electronic transactions over an open network, secure payment is required. Secure payment deals with potentially millions of customers who buy things over the Internet. There are different secure payment protocols which have been developed in the past few years. For example, IBM has developed a secure payment protocol called 10 (Internet K eyed Payment Protocol), which deals with a set of payment mechanisms such as credit and debit card transactions as well as electronic check clearing. Based on iKP, with assistance from IBM, GTE, Microsoft, Netscape, SAIC, Terisa, and Verisign, Visa and MasterCard have developed a secure payment protocol known as Secure Electronic Transaction (SET), as a method to secure payment card transactions over the Internet. Microsoft and Visa International have also developed a protocol called Secure Transaction Technology (STT), to handle secure payment with bank cards over the Internet.

International Application WO 97/415 for a "System and Method for Secure Network Electronic Payment and Credit Card Collection" of Verifone, Inc., is directed to permitting immediate deployment of a secure payment technology and architecture such as the SET architecture without first establishing a public key encryption infrastructure for use by consumers. The system set out in WO97/415 involves three parties, customer, merchant, and payment gateway, and relies heavily on Secure Socket Layer (SSL) to perform the communication and negotiation between the parties. Once PKI is established, it would appear that the system set forth in WO97/415 is no longer required.

With improved security, the Internet has become a more reliable and accepted transmission medium for all types of commercial transactions.

The use of open networks for tendering bid proposals in response to a call for tender is a natural extension of electronic commerce, particularly where security measures such as encryption, third party authentication and PKI are already available. An invitation to tender electronically is usually not different from more traditional formats; a non-extendible submission deadline is set for receipt of sealed bids, and only those tenders filed by the deadline are considered.

However, one issue that arises in electronic tendering not present in other areas of electronic commerce, is the requirement for the tendering process to be fair, particularly where public money is involved (i,e., the invitation to tender comes from a government or other public body). Where traditional non-electronic methods of bidding are used, tenders received are not opened immediately, but are stored in a secure location (a locked box), often with a trusted third party such as an accounting firm, to be opened after the time for bid submission has closed.

The challenge in the context of electronic procurement is to provide a secure environment analogous to a "locked box" for receipt of electronic bids, that can be entrusted to a third party, if desired. The locked information cannot be accessible to the third party, or to the party inviting tenders, at least until the tender deadline has expired.

SUMMARY OF THE INVENTION

It is therefore an object of the present invention to provide secure open tendering in the area of electronic procurement.

It is also an object of the invention to provide a secure open tendering protocol which does not require a third party holding the bid proposals to be a trusted third party.

Another object of the invention is to provide an electronic tendering system in which:
1. the party requesting tenders (eg., a government agency) cannot see the contents of bid proposals until the tender is closed;
2. a third party holding the submitted bids does not see the bid proposals at all where the third party is not a trusted third party; and
3. no vendor (bidder) can see the content of any other vendor's bid proposal.

In accordance with these and other objects, the invention provides a lock box mechanism for safely storing electronic bid proposals submitted by vendors during open tendering over a network. The mechanism consists of the following elements: (i) a first encryption key shared only between a vendor and a third party authenticator during the open tendering which is used by the vendor for transforming a bid proposal to an inaccessible form prior to submitting the bid proposal to a bid requester, (ii) means held privately by the bid requester for rendering the bid proposal inaccessible to the third party authenticator following submission by the vendor, and (iii) an electronic repository for storing the submitted bid proposal until expiry of the open tendering. According to one aspect, the bid requester has direct access to the electronic repository while the third party authenticator does not, and preferably, the bid requester notifies the third party authenticator of receipt of bid proposals. According to another aspect, the third party authenticator has access to the electronic repository and the bid requester does not. Then, preferably, the bid requester double-encrypts bid proposals it receives using its privately-held encryption key, and forwards the double-encrypted bid proposals on to the third part authenticator for storage.

The invention also provides a method for providing secure electronic tendering in an open network. On the bid requester's side, this method consists of publishing an invitation to tender electronic bid proposals (the invitation includes a requirement to encrypt bid proposals prior to submission using encryption keys generated from a specified authentication source), receiving encrypted bid proposals and rendering their contents inaccessible to the specified authentication source, and, on closure of the tendering, obtaining the encryption keys from the specified authentication source for accessing the bid proposals, On the side of the third pat authenticator, the method consists of generating an encryption key to a vendor for encrypting a bid proposal to be submitted by the vendor to the bid requester in response to a request, maintaining the vendor encryption key secret until notified of expiry of the open tender, and on the expiry of the open tender, forwarding the encryption key to the bid requester.

BRIEF DESCRIPTION OF THE DRAWINGS

Embodiments of the invention will now be described in detail in association with the accompanying drawings, in which.

DETAILED DESCRIPTION OF THE PREFERRED EMBODIMENTS

Figure 1:
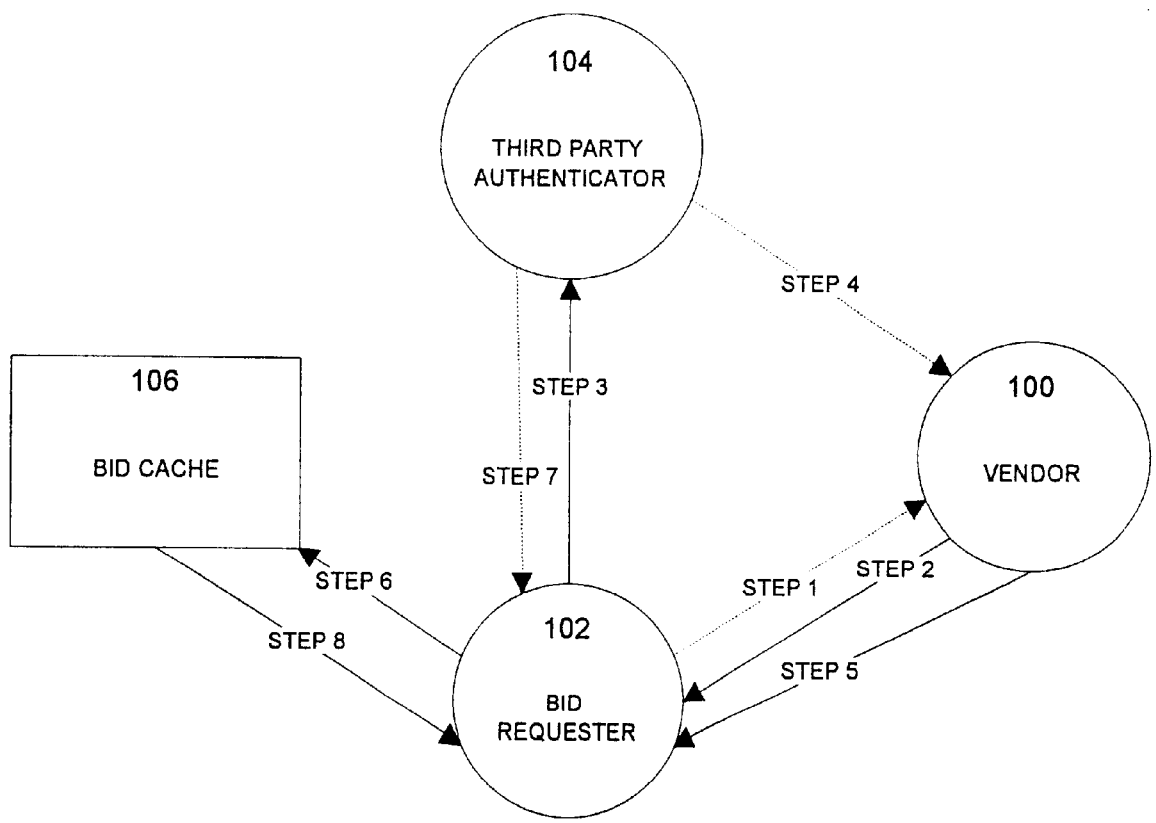
FIG. 1 is a schematic diagram illustrating a typical open tender situation in an electronic environment.

As illustrated in FIG. 1, there are three parties involved in a secure open tendering process according to the preferred embodiment of the invention, a vendor 100 who wants to be a supplier, a bid requester 102, such as a government body, and a third party authenticating body 104.

The present invention is not limited to any particular type of hardware and software support for such a system, provided the party components support network/Internet access and message digest, encryption, and digital signature technologies to assure integrity, privacy, authentication, and non-repudiation of communications between the parties.

For example, a commercial tendering system for a large organisation is described in commonly assigned application titled "A Token-Based Deadline Enforcement System for Electronic Document Submission", and filed in the Canadian Patent Office on Jan. 30, 1998, as Application No. 2,228,331, (IBM docket number CA998-003). In that system, a master buyer server operating under a Microsoft Windows NT® operating system collects purchase requisitions from inside the bid requesting organisation, stores the requirements on a document information gateway operating under an IBM RS/6000® operating system behind a gateway with a firewall that protects the network within the organisation from the external network. Communications with suppliers and third party authenticators are handled by security software which automatically builds a secure structure before forwarding a message to a supplier over the network, and unpacks the secure structures it receives from the network in order to forward plain messages to other components on the internal network to process. The master buyer server publishes invitation; to tender on a tender bulletin board that includes software able to notify external parties (i.e., potential suppliers/vendors) of calls for tender. The vendors make bid submissions to the system using submission software operating on PC operating systems with network/Internet access, such as IBM OS/2® Warp, Microsoft Windows® 95, etc. Third party authenticators have similar support.

Referring back to FIG. 1, a bid requester issues an invitation to tender (step 1) that sets forth the requirements for tendering. One necessary requirement to publish is the time frame in which the tendering process will remain open and bid proposals can be submitted. In the preferred embodiment, the invitation to tender also includes a requirement that prospective vendor/bidders obtained a proposal identifier (discussed below) prior to submitting a planned bid proposal. The proposal identifier accompanies a secret encryption key that the vendor is to use to encrypt the bid proposal prior to submission.

Thus, in response to the bid requester 102 issuing an invitation to tender (step 1), vendors 100 respond by indicating an intention to submit a tender and requesting authentication to do so (step 2). The bid requester 102 passes each authenticator request on to the third party authenticator 104 (step 3), which in turn provides each vendors authentication (step 4) directly back to that vendor 100 (step 4) or indirectly through the bid requester (not shown). Vendors 100 can then use their authentications to submit their bid proposals to the bid requester 102 (step 5). These proposals are kept in a bid cache 106, that could be located either with the bid requester 102 or the third party 104, until the closing day of the tender.

However, neither the bid requester 102 or the third party 104 will have enough information to see the contents of the cached tenders, and no vendor has access to the content of any other vendor's bid submission. After the tender submission deadline has passed and all tenders have been received in the cache 106, the third party 104 sends the bid requester 102 its information on the tenders, which could constitute the encrypted tenders themselves if the third party hosts the cache (step 7), to enable the bid requester 102 to open all bid proposals and selects the successful tender (step 8).

The secure open tendering protocol of the preferred embodiments of the invention is based on a public key infrastructure (PKI), where each party involved in the open tendering has a public encryption key and a digital signature key stored in a public key repository such as an X.500 directory or a public key database. These keys are certified by a Certification Authority (CA).

Figure 2:
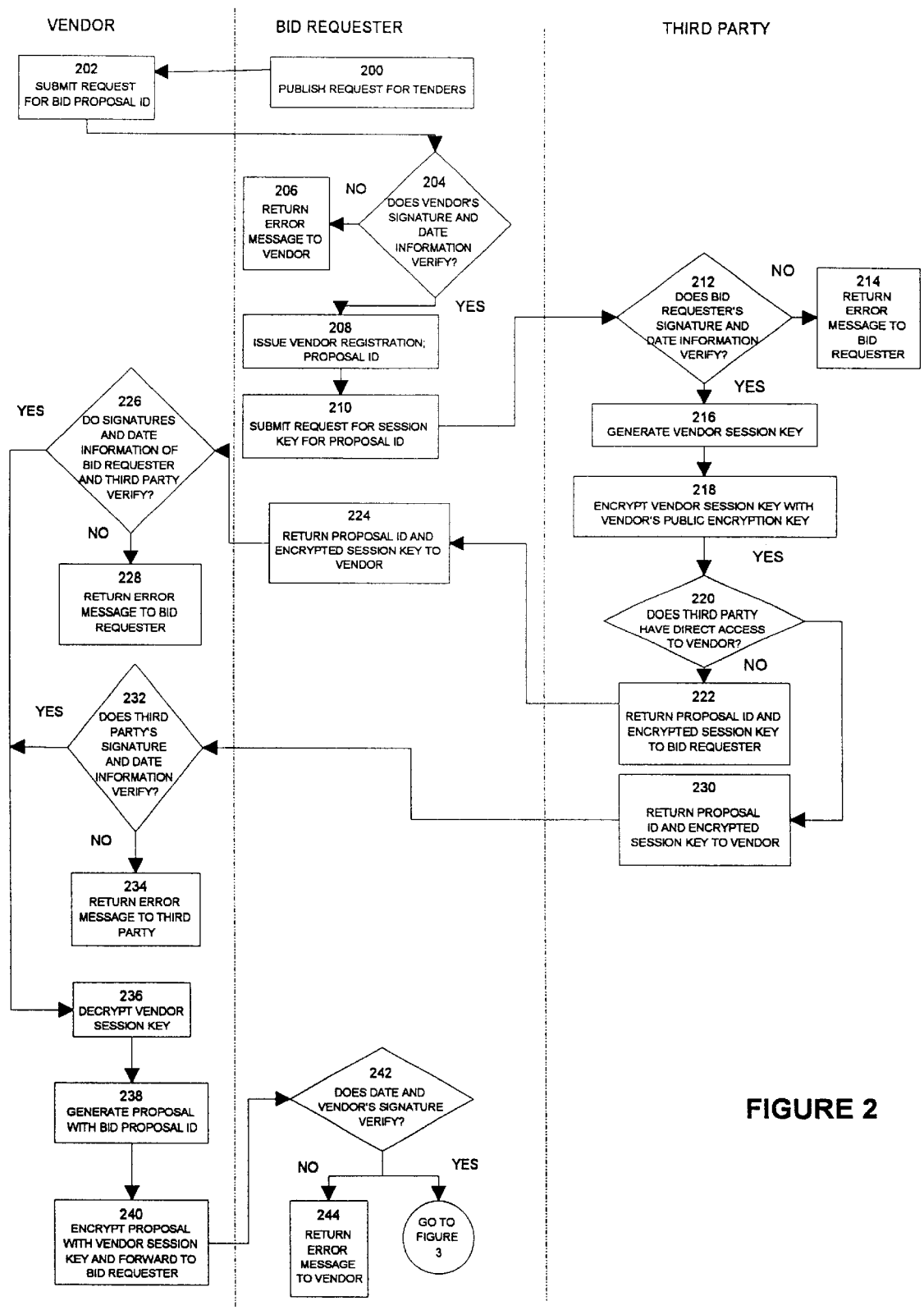
FIG. 2 is a flow diagram illustrating a process for third party authentication in a secure open tendering system according to the preferred embodiment of the invention.

This secure open tendering environment can be implemented by following the process set out in FIGS. 2 and 3.

Referring first to FIG. 2, the bid requester (eg., government agency) publishes an invitation to tender through any usual means (block 200). This can include advertising through non-electronic media such as newspapers, advertising through electronic media such as websites, and notifying known suppliers directly through electronic or non-electronic means.

A vendor who wishes to respond to the invitation to tender first makes a request to the bid requester for a bid proposal identifier by electronically sending the bid requester a REQUEST_ID message (block 202). The message contains the date and the vendor's digital signature.

On receipt of the vendor's REQUEST_ID message, the bid requester attempts to verify the vendor's digital signature and date information (block 204). Failure to do so results in an error message being returned to the vendor (block 206). If the signature and date verify, the bid requester registers the vendor by generating a proposal identifier (block 208), which it sends to the third pat authenticator asking for a session key that will be used for encrypting the vendor's bid proposal (block 208). This vendor's session key is a shared secret between the vendor and the third party until the tender submission deadline has passed and tendering is closed.

On receiving the bid requester's message requesting a vendor session key, the third party first verifies the bid requester's digital signature and date information (block 212, else go to block 214 and return an error message to the bid requester). After this verification, the third party generates the requested vendor session key (block 216) and encrypts it using the vendor's public encryption key (block 218). The third party returns the encrypted session key to the vendor in a REGISTERED_ID message that also contains the date information and digital signature of the third party. If the third party has direct access to the vendor, then the REGISTERED_ID message is forwarded directly to the vendor (blocks 220, 226). If the third party does not have direct access to the vendor, then the REGISTERED_ID message must be returned to the bid requester (blocks 220, 222), which in turn forwards the message on to the vendor (block 224).

The vendor receives the REGISTERED_ID message generated for it to obtain a proposal identifier, and verifies the digital signature and date information. If the message is from the third party directly (block 230), then this verification is for the third party's signature and date information only (block 232, else go to block 234 and return an error message to the third party). On the other hand, if forwarded by the requester (block 224), then both lie third party's and requester's signatures and date information should be verified. (Blocks 226, else go to block 238 and return an error message to the bid requester). If the signature(s) and date information verify, the vendor then decrypts the encrypted session key provided originally by the third party, by using its public key (block 236). The vendor generates a bid proposal or tender incorporating into it the proposal identifier (block 239, and encrypts the proposal using the session key (block 240). The encrypted proposal message is dated and digitally signed by the vendor, and returned to the bid requester which, on receipt, first verifies the date and signature information (block 242, else go to block 244 and return an error message to the vendor). Since the bid requester does not have the session key, it cannot read the vendor's bid proposal at this time.

Figure 3A:
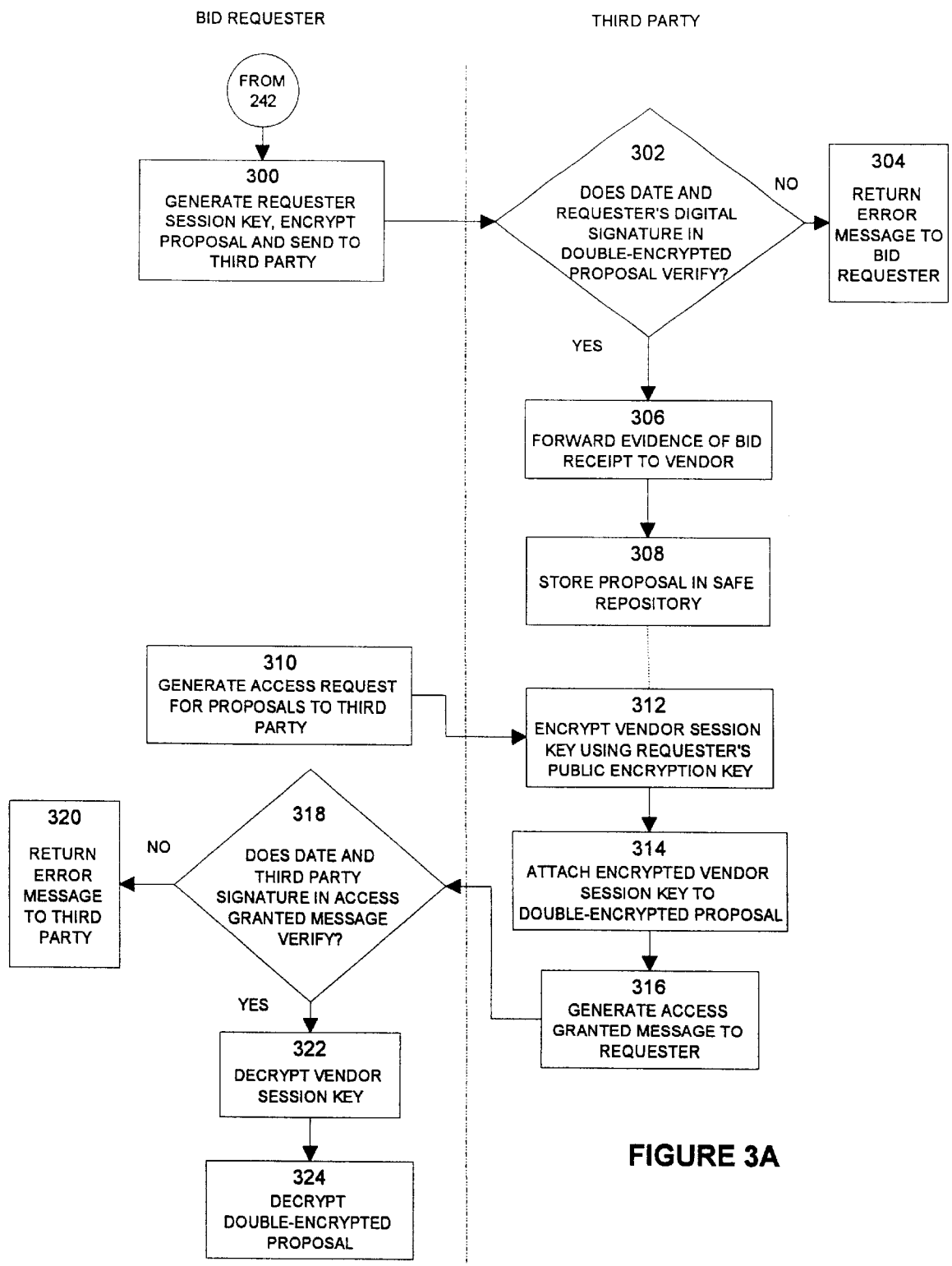
FIG. 3A is a flow diagram continuing from FIG. 2, illustrating one process for securely storing bids received in the tender process until expiry of the tender submission deadline, according to one aspect of the invention.
Figure 3B:
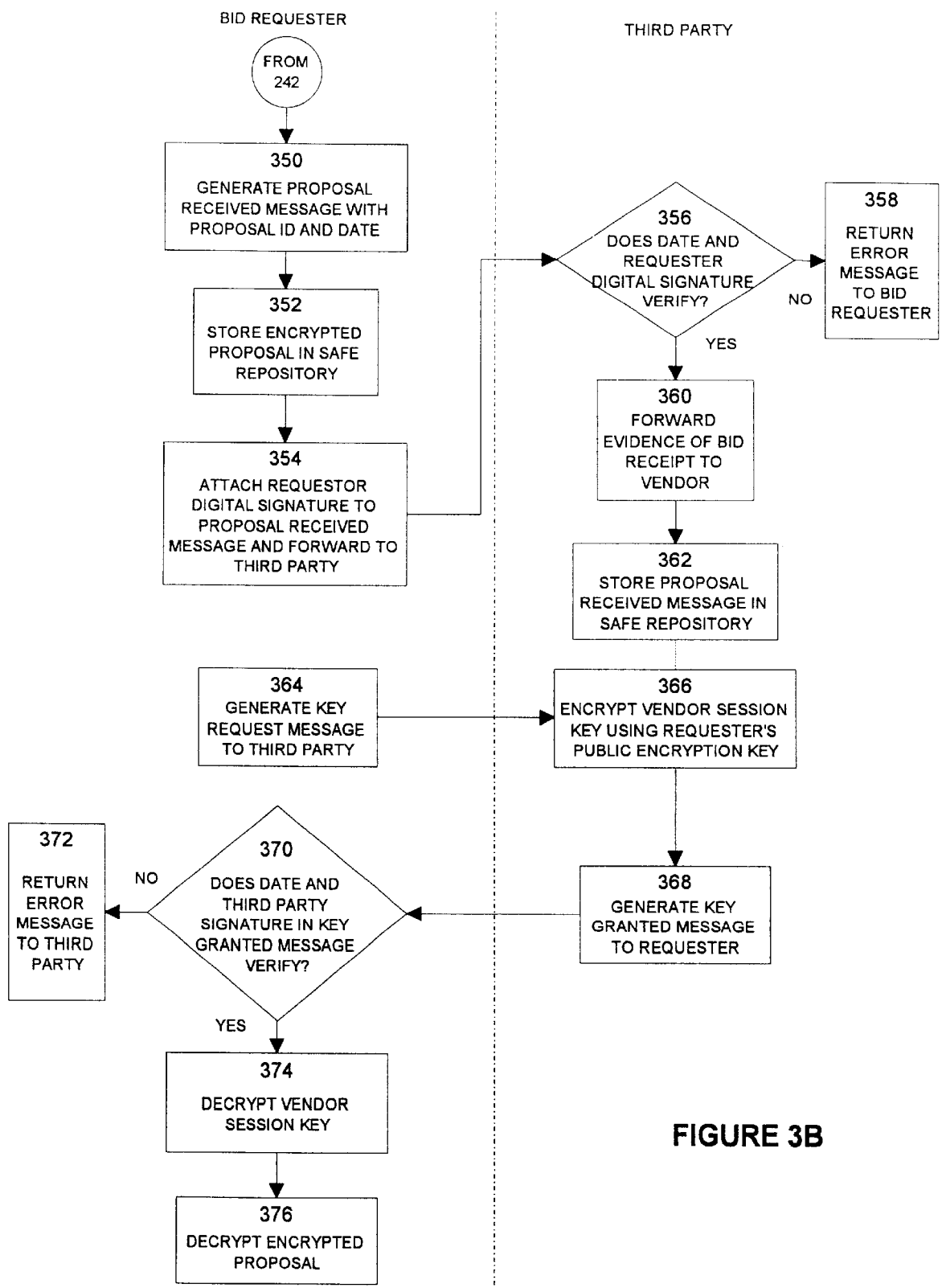
FIG. 3B is a flow diagram, similar to FIG. 3A, illustrating an alternate process for securely storing received bids until expiry of the tender submission deadline, according to another aspect of the invention.

FIGS. 3A and 3B illustrate alternate methods for securing the bid proposal in an electronic "lock box" until expiry of the bid submission deadline when all bid proposals are opened together.

Referring first to FIG. 3A, after verifying the date and vendor's digital signature contained in the proposal message, the bid requester generates a separate session key, called a requester session key, and encrypts the proposal again. The requester's session key will not be shared with anyone else, and it will be kept secretly by the bid requester itself. A message containing the double-encrypted proposal is dated and digitally signed by the bid requester, and forwarded to the third party (block 300) which verifies the date and bid requester's digital signature (block 302, else go to block 304 and return an error message to the bid requester). In the preferred embodiment, after verifying the date and digital signature contained in the double-encrypted proposal message, the third party forwards evidence of receipt of the proposal directly to the vendor. It should be noted that other systems could be employed for notifying the vendor of timely bid receipt, including sending the receipt directly from the bid requester to the vendor. A token-based system, where the vendor obtains a time-sensitive token to attach to the bid proposal prior to submitting it, is the subject matter of the above referenced IBM application for "A Token-Based Deadline Enforcement System for Electronic Document Submission";

Once the bid requester's signature and date information have been verified (block 302), the third party stores the proposal in a safe repository or cache until the tender close date (block 308).

After the deadline for tender submissions has expired, the bid requester generates an ACCESS_REQUEST message (block 310) which it sends to the third party to require the proposals to be delivered. The third party encrypts the vendor's session key using the bid requester's public encryption key (block 312), and attaches the encrypted session key to the double-encrypted proposal (block 314). An ACCESS_GRANTED message with the encrypted session key attached to the double-encrypted proposal is dated and digitally signed by the third party, and returned to the bid requester (block 316).

After verifying the date and third party signature (block 318, else go to block 320 and return an error message to the third party), the bid requester uses its own private key to decrypt the vendor's session key which was formerly shared only by the vendor and third party (block 322), and which was encrypted by the third party using the bid requester's public key (as discussed in relation to block 312). The bid requester then uses the decrypted vendor's session key together with its own secret session key to decrypt the vendor's bid proposal (block 124).

This system can be used whether or not the third party holding the bid proposal until expiry of the submission deadline is a trusted third party.

An alternative protocol can be derived from the secure open tendering protocol described above in which only a single encryption, rather than double encryption, is used. The third party can still be either trusted or untrusted.

This alternative method is illustrated in FIG. 3B.

After verifying the date and digital signature contained in the proposal message developed following the method of FIG. 2, the bid requester generates a PROPOSAL_RECEIVED message on the encrypted proposal received from the vendor using the proposal identifier and date information of that proposal (block 350). The bid requester digitally signs the PROPOSAL_RECEIVED message, and sends it to the third party (block 354), while storing the encrypted bid proposal in its own cache (block 352). It should be noted that the bid requester does NOT send a copy of the actual encrypted proposal to the third party which holds the vendor's session key for decrypting the proposal. Thus, the third party has no access to the encrypted bid proposal even though it shares the encryption key with the vendor.

After verifying the date and digital signature contained in the PROPOSAL_RECEIVED message (block 356, else go to block 358 and return an error message to the bid requester), the third party forwards evidence of bid receipt to the vendor (block 360) and keeps the PROPOSAL_RECEIVED message in a safe repository for a future non-repudiation purpose (block 362).

After expiry of the tender submission date, the bid requester sends a KEYREQUEST message to the third party to require the vendor's session key to access the vendor's encrypted proposal (block 364). The third party encrypts the session key shared between the it and the vendor, by using the bid requester's public encryption key (block 366). A KEY_GRANTED message containing the encrypted session key and the third party's digital signature is sent to the bid requester (block 368).

After verifying the date and third party signature in the KEY_GRANTED message (block 370, else go to block 372 and return an error message to the third party), the bid requester uses its own private key to decrypt the encrypted vendor's session key which was formerly shared only by the vendor and third party (block 374), and which was encrypted by the third party using the requester's public key (as discussed in relation to block 366). The bid requester then uses the decrypted vendor's session key to decrypt the vendor's bid proposal (block 376).

Embodiments of the invention that would be obvious to the person skilled in the art are intended to be covered by scope of the appended claims.

What is claimed:

1. An electronic lock box mechanism for safely storing electronic bid proposals submitted by vendors during open tendering over a network, comprising:
    a first encryption key shared only between a vendor and a third party authenticator during the open tendering, said encryption key being used by the vendor for transforming a bid proposal to an inaccessible form prior to submitting the bid proposal to a bid requester;
    means held privately by the bid requester for rendering the bid proposal inaccessible to the third party authenticator following submission by the vendor; and an electronic repository for storing the submitted bid proposal until expiry of the open tendering.

2. An electronic lock box mechanism, according to claim 1, wherein the means held privately by the bid requester for rendering the bid proposal inaccessible to the third party authenticator following submission by the vendor comprises:

direct access to the electronic repository for storing and retrieving bid proposals; and means for notifying the third party authenticator on receipt and storage of the bid proposal; and wherein the third party authenticator does not have access to the electronic repository.

3. An electronic lock box mechanism, according to claim 2, further comprising means held by the bid requester for retrieving the bid proposal from the electronic repository and obtaining the first encryption key from the third party authenticator on the expiry of the open tendering.

4. An electronic lock box mechanism, according to claim 1, wherein the means held privately by the requester for rendering the bid proposal inaccessible to the third party authenticator following submission by the vendor comprises:

a second encryption key held privately by the bid requester for encrypting the transformed proposal submitted by the vendor; and means for forwarding the double-encrypted proposal to the third party authenticator for storage until the expiry of the open tendering; and wherein the third party authenticator has access to the electronic repository for storing and retrieving bid proposals.

5. An electronic lock box mechanism, according to claim 4, further comprising means held by the third party authenticator for retrieving the double-encrypted proposal from the electronic repository, attaching the first encryption key to the double-encrypted proposal to form a message, and forwarding the message to the bid requester, on the expiry of the open tendering.

6. A method, implemented by a bid requesting party, for providing secure electronic tendering in an open network, comprising:

publishing an invitation to tender electronic bid proposals, said invitation including a requirement to encrypt bid proposals prior to submission using encryption keys generated from a specified authentication source;

receiving encrypted bid proposals and rendering their contents inaccessible to the specified authentication source; and on closure of the tendency, obtaining he encryption keys from the specified authentication source for accessing the bid proposals.

7. A method, according to claim 6, wherein the step of rendering the contents of the bid proposals inaccessible to the specified authentication source comprises:

caching the encrypted bid proposals; and notifying the specified authentication source of bids received.

8. A method according to claim 6, wherein the step of rendering the contents of the bid proposals inaccessible to the specified authentication source comprises:

double-encrypting bid proposals received using a private encryption key unknown to the specified authentication source; and forwarding the double-encrypted bid proposals to the specified authentication authority for safekeeping;

and wherein the step of obtaining the encryption keys from the specified authentication source for accessing the bid proposals on closure, comprising obtaining the doubly-encrypted proposals along with the encryption keys from the specified authentication source.

9. A method, implemented by an authentication party, for providing security in an open tender initiated by a bid requester, comprising:

in response to a request, generating an encryption key to a vendor for encrypting a bid proposal to be submitted by the vendor to the bid requester;

maintaining the vendor encryption key secret until notified of expiry of the open tender; and on the expiry of the open tender, forwarding the encryption key to the bid requester.

10. A method, according to claim 9, further comprising:

caching the bid proposal received from the bid requester, said bid proposal being doubly-encrypted with the key generated to the vendor and a private encryption key of the bid requester; and on the expiry of the open tender, returning the bid proposal attached to the vendor encryption key to the bid requester.

11. A computer program product recorded on computer readable media for safely storing electronic bid proposals submitted by vendors during open tendering over a network, comprising:

computer readable means for sharing a first encryption key only between a vendor and a third party authenticator during the open tendering, said encryption key being used by the vendor for transforming a bid proposal to an inaccessible form prior to submitting the bid proposal to a bid requester;

computer readable means held privately by the bid requester for rendering the bid proposal inaccessible to the third party authenticator following submission by the vendor; and computer readable electronic repository means for storing the submitted bid proposal until expiry of the open tendering.

12. The computer program product,according to claim 11, wherein the computer readable means hold privately by the bid requester for rendering the bid proposal inaccessible to the third party authenticator following submission by the vendor comprises:

computer readable means for directly accessing the electronic repository for storing and retrieving bid proposals; and computer readable means for notifying the third party authenticator on receipt and storage of the bid proposal; and wherein the third party authenticator does not have access to the electronic repository.

13. The computer program product according to claim 12, further comprising computer readable means held by the bid requester for retrieving the bid proposal from the electronic repository and obtaining the first encryption key from the third party authenticator on the expiry of the open tendering.

14. The computer program product according to claim 11, wherein the computer readable means hold privately by the bid requester for rendering the bid proposal inaccessible to the third party authenticator following submission by the vendor comprises:

a second computer readable encryption key means held privately by the bid requester for encrypting the transformed proposal submitted by the vendor; and computer readable means for forwarding the double-encrypted proposal to the third party authenticator for storage until the expiry of the open tendering;

and wherein the third party authenticator has access to the electronic repository for storing and retrieving bid proposals.

15. The computer program product according to claim 14, further comprising computer readable means held by the third party authenticator for retrieving the double-encrypted proposal from the electronic repository, attaching the first encryption key to the double-encrypted proposal to form a message, and forwarding the message to the bid requester, on the expiry of the open tendering.

* * * * *